(12) United States Patent
Zhou et al.

(10) Patent No.: US 10,251,405 B2
(45) Date of Patent: Apr. 9, 2019

(54) MEAT CUTTING MACHINE

(71) Applicants: Zhuhai Eagle Mechanical and Electrical Co., Ltd., Zhuhai (CN); AMERICAN EAGLE FOOD MACHINERY, INC., Chicago, IL (US)

(72) Inventors: Zhongde Zhou, Zhuhai (CN); Shiliang Yang, Zhuhai (CN)

(73) Assignees: Zhuhai Eagle Mechanical and Electrical Co., Ltd., Zhuhai (CN); AMERICAN EAGLE FOOD MACHINERY, INC., Chicago, IL (US)

( * ) Notice: Subject to any disclaimer, the term of this patent is extended or adjusted under 35 U.S.C. 154(b) by 36 days.

(21) Appl. No.: 15/691,744

(22) Filed: Aug. 31, 2017

(65) Prior Publication Data
US 2018/0055063 A1    Mar. 1, 2018

(30) Foreign Application Priority Data

Aug. 31, 2016  (CN) .......................... 2016 1 0795549

(51) Int. Cl.
*A22C 17/00*    (2006.01)

(52) U.S. Cl.
CPC ...... *A22C 17/0013* (2013.01); *A22C 17/0033* (2013.01)

(58) Field of Classification Search
CPC .. A22C 17/00; A22C 17/0006; A22C 17/0033
USPC ........................................ 452/141–143, 177
See application file for complete search history.

(56) References Cited

U.S. PATENT DOCUMENTS

| | | | | | |
|---|---|---|---|---|---|
| 2,554,863 | A | * | 5/1951 | Lindner | A22C 9/008 452/142 |
| 2,704,858 | A | * | 3/1955 | Deckert | A22C 9/008 452/142 |
| 2,718,028 | A | * | 9/1955 | Read | A22C 9/008 312/290 |

(Continued)

FOREIGN PATENT DOCUMENTS

| | | |
|---|---|---|
| CN | 2203212 Y | 7/1995 |
| CN | 2661395 Y | 12/2004 |

(Continued)

*Primary Examiner* — Richard T Price, Jr.
(74) *Attorney, Agent, or Firm* — Wayne & Ken, LLC; Tony Hom (57) ABSTRACT

A meat cutting machine of the present invention includes a machine frame and a cutter group. The cutter group includes at least two groups of cutter bars. Blades on the two groups of cutter bars are crosswise arranged to form a cutting edge region. The machine frame includes an upper machine frame, a lower machine frame and a regulating ejector rod. At least one threaded through hole is formed in a side wall of the machine frame. The cutter bars include shaft shoulders. Since the upper machine frame and the lower machine frame are separable and the cutter bars are convenient for disassembly and removal, the cutter bars can be easily washed and are sanitary in design. The regulating ejector rod can be used to perform minor distance adjustments between interactive blades, which ensures close cooperation between two matched blades and the meat cutting effect of the meat cutting machine.

16 Claims, 6 Drawing Sheets

(56) References Cited

U.S. PATENT DOCUMENTS

| | | | | |
|---|---|---|---|---|
| 3,116,514 A | * | 1/1964 | Schmidt | B26D 3/08 |
| | | | | 452/141 |
| 3,786,536 A | * | 1/1974 | Deckert | A22C 9/00 |
| | | | | 452/141 |
| 3,823,441 A | * | 7/1974 | Bridge, Jr. | A22C 9/004 |
| | | | | 452/142 |
| 4,085,482 A | * | 4/1978 | Charron | A22C 9/004 |
| | | | | 452/142 |
| 4,348,787 A | * | 9/1982 | Wolff | A22C 9/004 |
| | | | | 100/153 |
| 4,672,716 A | * | 6/1987 | Dickey | A22C 9/008 |
| | | | | 452/142 |
| 5,342,236 A | * | 8/1994 | Repisky | B26D 1/24 |
| | | | | 452/142 |
| 5,430,354 A | * | 7/1995 | Garbowicz | H05B 37/03 |
| | | | | 315/159 |
| 5,738,578 A | * | 4/1998 | Marchese | A22C 9/008 |
| | | | | 452/142 |
| 6,036,591 A | * | 3/2000 | Bonon | A22C 9/004 |
| | | | | 452/142 |
| 7,682,227 B1 | * | 3/2010 | Bifulco | A22C 17/0006 |
| | | | | 452/141 |
| 7,806,754 B2 | * | 10/2010 | Stoughton | A22C 9/004 |
| | | | | 452/141 |

FOREIGN PATENT DOCUMENTS

| | | |
|---|---|---|
| CN | 201056007 Y | 5/2008 |
| CN | 202311057 U | 7/2012 |
| CN | 203380948 U | 1/2014 |
| CN | 203460243 U | 3/2014 |
| CN | 204604403 U | 9/2015 |
| CN | 206066534 U | 4/2017 |
| GB | 1573035 A | 8/1980 |

* cited by examiner

MEAT CUTTING MACHINE

TECHNICAL FIELD

The present invention relates to the field of food processing equipment, and particularly relates to a meat cutting machine.

BACKGROUND OF THE INVENTION

An existing meat cutting machine realizes cutting processing of meat through a principle of a cutting edge region similar to scissors. Two cutter bars are arranged in a machine frame of the meat cutting machine, and rotate relative to each other. Blades on the two cutter bars are mutually staggered to form the cutting edge region. A plurality of blades installed in parallel on the same cutter bar can realize batch cutting processing of meat food, thereby bringing very high cutting efficiency.

The existing meat cutting machine has the following problems: firstly, for example, the cutter bars of the existing meat cutting machine cannot be disassembled, so that the meat cutting machine cannot easily be washed and is difficult to meet high sanitation standards, thereby generating odors and negatively affecting use; secondly, for example, after the blades on the cutter group are abraded, a gap is easy to appear between two matched blades, causing the blades to interact poorly, resulting in poor meat cutting performance, complete failure to cut meat, and other problems; and next, the cutter bars of the meat cutting machine are transversely fixed and cannot generate axial displacement, so that a cutting edge spacing of blades between adjacent cutter bars is fixed and non-adjustable, causing inconvenient use.

SUMMARY OF THE INVENTION

One purpose of the present invention is to provide a meat cutting machine which is easy to be cleaned, capable of meeting high sanitation standards, and increasing the operational reliability of meat cutting performance. Another purpose is to make a spacing between cutting blades of blades between cutter bars adjustable, so as to satisfy different meat cutting width needs to realize more convenient use of the meat cutting machine.

The present invention provides a meat cutting machine comprising a machine frame and a cutter group. The cutter group comprises at least two groups of cutter bars. The two groups of cutter bars are mutually parallel. Blades on the two groups of cutter bars are crosswise arranged to form a cutting edge region. The machine frame comprises an upper machine frame and a lower machine frame. The upper machine frame and the lower machine frame are detachably connected. The cutter bars are supported on the lower machine frame. The cutter bars are limited on the upper machine frame. The meat cutting machine further comprises a regulating ejector rod. At least one threaded through hole is formed in a side wall of the machine frame. The regulating ejector rod is in thread fit with the threaded through hole. The two groups of cutter bars further comprise shaft shoulders. The regulating ejector rod penetrates through the threaded through hole and is abutted against end surfaces of the shaft shoulders so that one group in the two groups of cutter bars performs translation along a central shaft.

It can be seen that since the upper machine frame and the lower machine frame are detachable and the cutter bars are convenient for disassembly and removal, the cutter bars are simpler to wash and are more sanitary in design. The shaft shoulders are arranged on the cutter bars. The regulating ejector rod installed on the side wall of the machine frame can be regulated, so as to realize regulation of relative positions of the cutter bar and an adjacent cutter bar, realize distance regulation between interactive blades, ensure close cooperation between two matched blades and ensure the meat cutting machine can maintain long term performance in reliably cutting meat.

A further solution is as follows: each of the cutter bars comprises a central shaft and a regulating shaft sheath; the central shaft and the regulating shaft sheath are in concentric assembly and rotating fit; the regulating shaft sheath is supported on the lower machine frame; the regulating shaft sheath is limited on the upper machine frame; and the regulating shaft sheaths have the shaft shoulders.

It can be seen that when the central shaft rotates, the regulating shaft sheaths are in a non-rotation state, and the regulating ejector rods are abutted against the regulating shaft sheaths in the non-rotation state so as to realize real-time regulation for an operation state and effectively prevent accelerated abrasion of the regulating ejector rods.

Preferably, the shaft shoulders are located in the machine frame, and the threaded through hole is located in the side wall of the machine frame close to the shaft shoulders. The structure is beneficial for regulation of the regulating ejector rods.

Preferably, a limiting surface used for limiting on the upper machine frame and a supporting surface correspondingly matched for supporting on the lower machine frame are closely fitted with an outer circumferential surface of a contact part of the cutter bars for sealing. The structure is simple and is also beneficial for sealing without the need for additionally installing a sealing ring.

Preferably, gears are also respectively arranged on the two groups of cutter bars, and the gears are close to the side wall of the machine frame for transmission between the two groups of cutter bars. The structure occupies a small space, and is beneficial for the operation of the meat cutting machine.

Further preferably, the gears are located in the machine frame, and the shaft shoulders are located between the gears and an inner side wall of the machine frame close to the gears. The structure is more simple and is also beneficial for smooth regulation of the regulating ejector rods.

Further preferably, the upper machine frame and the lower machine frame respectively further comprise a baffle plate; and when the upper machine frame and the lower machine frame are assembled together, the baffle plates of the upper machine frame and the lower machine frame divide an inner space of the machine frame into a gear operating region and a meat cutting operation region and through holes through which the cutter bars penetrate are reserved in the baffle plates of the upper machine frame and the lower machine frame; and the through hole is formed by superposing or splicing the baffle plates of the upper machine frame and the lower machine frame. The structure is beneficial for smooth transmission of the gears, is beneficial for inner cleaning of the machine frame and is more reasonable in spatial layout.

Further preferably, the gears are located in the gear operation region, and the blades are located in the meat cutting operation region.

Further preferably, the gear operation region of the upper machine frame is in an approximate groove shape.

Further preferably, the gear operation region of the lower machine frame is vertically penetrated.

Further preferably, in the two gears, a gear thickness of the gears translating along with the cutter bars is larger than a translation distance so that the two gears remain meshed together.

Preferably, one group in the two groups of cutter bars further comprises an input shaft; the upper machine frame further comprises an input shaft limiting part; the lower machine frame further comprises an input shaft supporting part; and when the upper machine frame and the lower machine frame are assembled together, the input shaft limiting part and the input shaft supporting part together form an internationally universal No. 12 hub pin connector.

Preferably, one group in the two groups of cutter bars can perform translation by 3-20 mm relative to the other group along a central shaft.

Preferably, the meat cutting machine further comprises a comb cutter; the comb cutter comprises comb teeth and a comb back plate; the comb teeth are approximately perpendicular to the comb back plate and form an integral structure with the comb back plate; and the comb cutter is detachably fixedly arranged at a bottom of the lower machine frame.

Preferably, the meat cutting machine further comprises a feeding port cover; the feeding port cover is in a shape which is retracted in a middle or an approximate V shape; and a minimum cross-sectional width is below a maximum cut-able width of the cutter group.

A further solution is as follows: abutting positions between the regulating ejector rods and the regulating shaft sheaths are inside the machine frame.

It can be seen that transmission positions are inside the machine frame so as to ensure that a transmission part is not influenced by environmental conditions, thereby increasing service life.

A further solution is as follows: end surfaces of the shaft shoulders face an inner wall of the machine frame; and end surfaces of the regulating ejector rods are abutted against the end surfaces of the shaft shoulders.

A further solution is as follows: a direction of an action force applied to the regulating shaft sheaths by the regulating ejector rods is parallel to the axial direction of the central shaft of the cutter bars.

It can be seen that the direction of the action force applied to the regulating shaft sheaths by the regulating ejector rods is the same as a motion direction of the cutter bars, thereby ensuring that more labor is saved during regulation.

A further solution is as follows: the number of the threaded through holes is more than two, and a plurality of threaded through holes are uniformly arranged in the circumferential direction of the cutter bars.

It can be seen that a plurality of regulating ejector rods are simultaneously abutted against the regulating shaft sheath, thereby ensuring that stress on one end of the cutter bar is uniform without generating a bending moment, deformation and the like which have adverse effects on the cutter bars.

A further solution is as follows: the threaded through holes are arranged in the upper machine frame and the lower machine frame.

It can be seen that this practice increases connection stability among the upper machine frame, the lower machine frame and the cutter bars.

A further solution is as follows: the regulating shaft sheaths and the central shaft are connected through a bearing to allow smoother rotation and improve performance by decreasing frictional forces.

A further solution is as follows: two adjacent cutter bars realize transmission through the gears.

It can be seen that production cost can be effectively reduced by using universal bearings and gears.

BRIEF DESCRIPTION OF THE DRAWINGS

The present invention is further described below in combination with drawings and embodiments.

Corresponding relationships of various labels in drawings are as follows: upper machine frame 1; feeding port 100; input shaft limiting part 101; driving shaft limiting part 102; driven shaft first limiting part 103; driven shaft second limiting part 104; inner wall surface 105; threaded through hole 110; threaded through hole 120; lower machine frame 2; discharging port 200; input shaft supporting part 201; driving shaft supporting part 202; driven shaft first supporting part 203; driven shaft second supporting part 204; inner wall surface 205; baffle plate 206; threaded through hole 210; threaded through hole 220; cutter group 3; cutting blade region 30; first cutter bar 31; central shaft 310; power input end 301; driving gear 302; driven gear 303; blade 311; bearing 314; second cutter bar 32; central shaft 320; blade 321; bearing 324; shaft sheath 330; shaft sheath 340; shaft shoulder 341; end surface 342; outer circumferential surface 343; regulating ejector rod 4; end surface 401; regulating ejector rod 5; end surface 50; comb cutter 6; comb tooth 61; comb back plate 62; regulating and installing groove 63; knob screw 64; outer cover 7; handle 71; knob screw 72; machine frame cover 73; and feeding port cover 74.

DETAILED DESCRIPTION OF THE INVENTION

The present invention will be further described below in combination with drawings and embodiments.

As shown in FIG. 1 to FIG. 6, a specific embodiment of the meat cutting machine of the present invention is shown. The meat cutting machine in the present embodiment comprises a machine frame and a cutter group 3 installed in the machine frame. A cutting edge region 30 is formed between two blades on the cutter group 3 so that meat blocks which enter from a feeding port 100 are sheared into strip shapes or sheet shapes by the cutter group 3 and discharged from a discharging port 200 of the machine frame.

Figure 1:
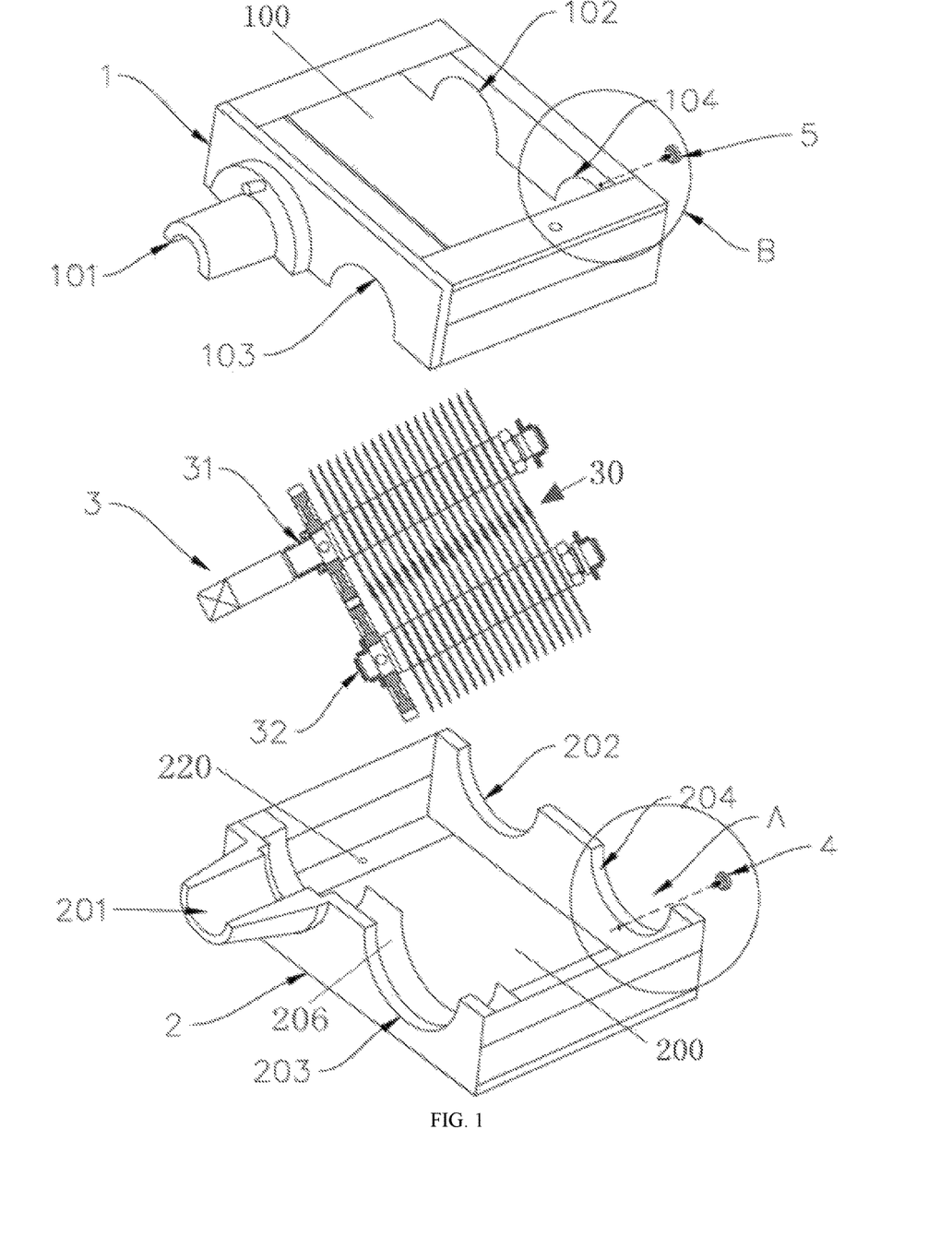
FIG. 1 is a structural exploded diagram of a meat cutting machine of the present invention.

By referring to FIG. 1, FIG. 1 is a structural exploded diagram of a meat cutting machine. The machine frame comprises an upper machine frame 1 and a lower machine frame 2. The upper machine frame 1 and the lower machine frame 2 are combined jointly to form the machine frame for locating the cutter group 3. The upper machine frame 1 and the lower machine frame 2 are similar structurally. The upper machine frame 1 is an open cover body having a connecting wall on a periphery, and forms the feeding port 100. Installation places are arranged on two side walls of the upper machine frame 1. The installation place of the upper machine frame 1 comprises an input shaft limiting part 101, a driving shaft limiting part 102, a driven shaft first limiting part 103 and a driven shaft second limiting part 104. The lower machine frame 2 is a semi-cavity having a connecting wall on a periphery and having an opening on a bottom wall, and forms the discharging port 200. Four supporting and installing places are arranged on the side walls of two opposite sides of the lower machine frame 2: an input shaft supporting part 201, a driving shaft supporting part 202, a driven shaft first supporting part 203 and a driven shaft second supporting part 204.

The upper machine frame 1 and the lower machine frame 2 are also provided with baffle plates. The baffle plate of the upper machine frame 1 can be arranged by referring to the structure and the position of the baffle plate of the lower machine frame 2. After the upper machine frame 1 and the lower machine frame 2 are combined and installed, the baffle plates of the upper machine frame 1 and the lower machine frame 2 are superposed or spliced together and through holes through which a first cutter bar 31 and a second cutter bar 32 respectively penetrate are formed. Meanwhile, a space in the machine frame is also divided by the baffle plates into a gear operating region and a meat cutting operation region. The gear operation region of the upper machine frame 1 is in an approximate groove shape. A top of the gear operation region is not open, which is beneficial for preventing food material from entering, so that gear operation is more smooth, steady and reliable. The gear operation region of the lower machine frame 2 has an opening on a bottom, i.e., perforated vertically. The structure enables the food material that enters the gear operation region to be immediately discharged, prevents the food material from remaining and avoids causing pollution due to remaining food material. The food material in the meat cutting operation region is physically blocked by the baffle plates, is difficult to enter the gear operation region and is more difficult to leak from the side wall of the machine frame through the gear operation region. A spacer or sealing ring does not need to be additionally arranged on the side wall. Meanwhile, since gears are operated in the machine frame, the meat cutting machine is simple in structure, high in safety, reliable in operation and transmission and beneficial for connection between the machine frame and other types of power units.

After the upper machine frame 1 and the lower machine frame 2 are combined and installed, the input shaft limiting part 101 and the input shaft supporting part 201 together preferably form an internationally universal No. 12 connector. The type of the connector is wide in application scope and can be completely connected with a plurality of types of power units so that the meat cutting machine is not limited by a special power unit. The connector can be used as a fitting of a stirrer, a slice cutter, a filament cutter and a tender meat machine applicable to No. 12 connector, to realize convenient usage and benefit environmental protection.

Figure 2:
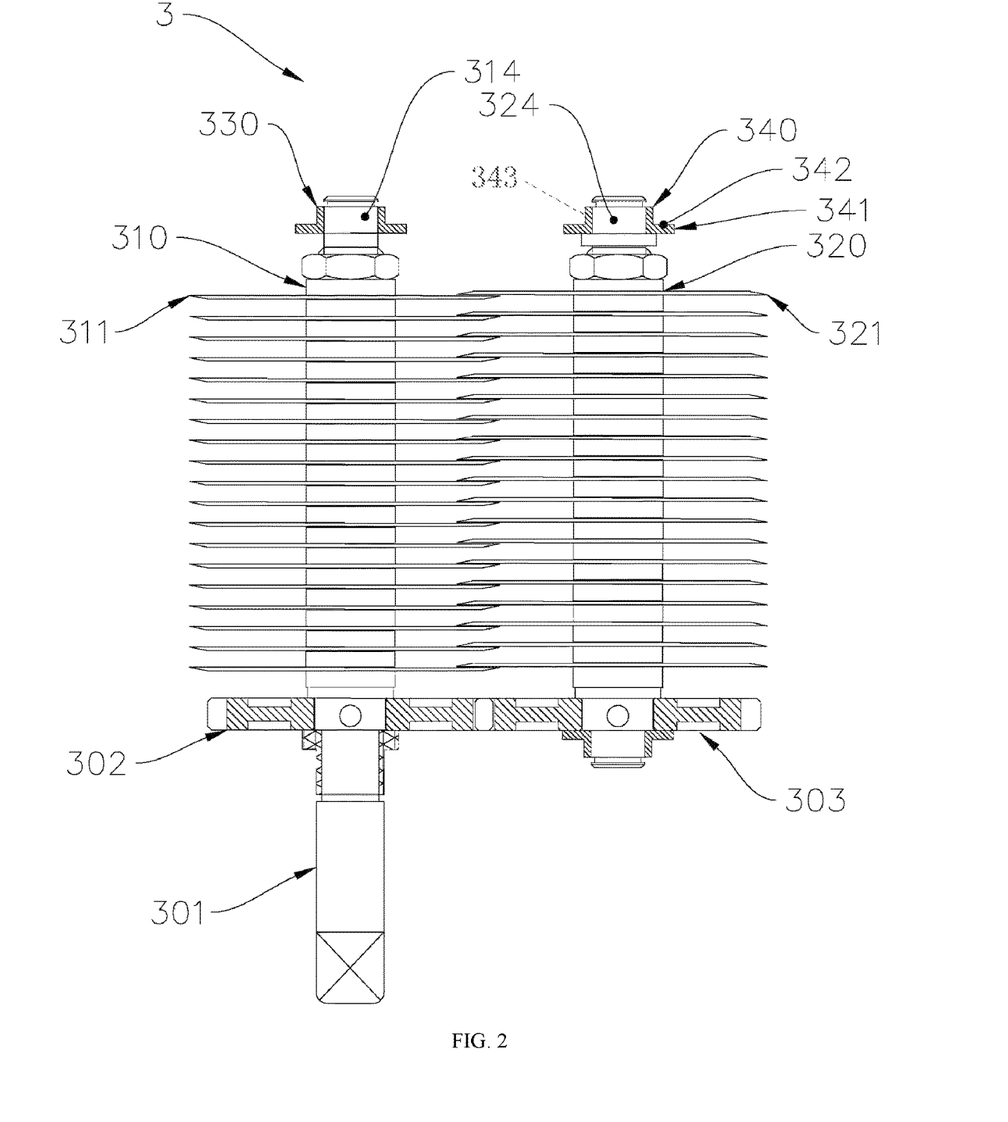
FIG. 2 is a structural diagram of a cutter group in embodiments of a meat cutting machine of the present invention.

By referring to FIG. 2, FIG. 2 is a structural diagram of a cutter group 3. In combination with FIG. 1, the cutter group 3 in the present embodiment is formed by combining a group of two cutter bars. Specifically, the cutter group 3 comprises a first cutter bar 31 and a second cutter bar 32.

The first cutter bar 31 comprises a central shaft 310. A plurality of blades 311 arranged at an equal distance are sleeved on the central shaft 310. The blades 311 are disc-shaped blades. A first end of the central shaft 310 is a power input end 301. The power input end 301 can be connected to a driving motor through a coupling. The first end of the central shaft 310 is located in the power input end 301 and is provided with a driving gear 302. A second end of the central shaft 310 is sleeved with a shaft sheath 330. The shaft sheath 330 and the central shaft 310 realize rotatable connection through a bearing 314.

The second cutter bar 32 comprises a central shaft 320. A plurality of blades 321 arranged at an equal distance are sleeved on the central shaft 320. The blades 321 are disc-shaped blades. A driven gear 303 is installed on a first end of the central shaft 320. A regulating shaft sheath 340 is sleeved on a second end of the central shaft 320. The shaft sheath 340 and the central shaft 320 realize rotatable connection through a bearing 324.

The first cutter bar 31 is installed on the input shaft supporting part 201 and the driving shaft supporting part 202. Since the central shaft 310 and the lower machine frame 2 are connected through a bearing, the central shaft 310 can drive the blades 311 to rotate relative to the lower machine frame 2. The second cutter bar 32 is installed on the driven shaft first supporting part 203 and the driven shaft second supporting part 204. Similar to the first cutter bar 31, the central shaft 320 can drive the blades 321 to rotate relative to the lower machine frame 2.

The first cutter bar 31 and the second cutter bar 32 installed on the installation places of the machine frame have a fixed center distance. At a set center distance, the blades 311 on the first cutter bar 31 and the blades 321 on the second cutter bar 32 form an overlapped and crossed state. One blade 311 and one blade 321 are closely fitted. When the power input end 301 is connected with a driving apparatus, then the first cutter bar 31 transmits a torque to the second cutter bar 32 through engaged transmission between the driving gear 302 and the driven gear 303 and the disc-shaped blades 311 and blades 321 simultaneously rotate in opposite rotating directions. At this moment, intersection regions of the blades 311 and the blades 321 form cutting blade regions 30. Mean food material is put at a starting point of rotating intersection of the blades 311 and the blades 321. Two shear forces of the blades 311 and the blades 321 in opposite directions simultaneously extrude the meat food material. The meat food material is sheared into two parts by taking the blades 311 and the blades 321 as dividing lines.

After the cutter group 3 is installed, the upper machine frame 1 and the lower machine frame 2 need to be installed. After the upper machine frame 1 is covered in a corresponding position of the lower machine frame 2, the input shaft limiting part 101 and the driving shaft limiting part 102 of the upper machine frame 1 simultaneously limit the movement of the first cutter bar 31 in a vertical direction, and the driven shaft first limiting part 103 and the driving shaft second limiting part 104 simultaneously limit the movement of the second cutter bar 32 in a vertical direction. Therefore, limiting installation of the machine frame for the cutter group 3 is completed. The upper machine frame 1 and the lower machine frame 2 are fixed through bolts after being covered. Bolt locking belongs to a detachable installation manner. During specific implementation, the upper machine frame 1 can be matched with the lower machine frame 2, the lower machine frame 2 supports the upper machine frame 1, and threaded through holes are respectively formed at crossed and overlapped parts of two opposite side walls of the upper machine frame 1 and two opposite side walls of the lower machine frame 2, and are detachable fixed through knob screws. Meanwhile, the first cutter bar 31 and the second cutter bar 32 of the cutter group 3 can be disassembled from the machine frame. Therefore, the cleaning work of the meat cutting machine is simple and convenient, thereby preventing the meat cutting machine from generating peculiar smells that negatively affect normal use due to unsanitary conditions and improving food safety.

After the cutter group 3 is installed and the upper machine frame 1 and the lower machine frame 2 are fixed, preferably, a limiting surface of each limiting and installation place on the upper machine frame 1 and a supporting surface of each correspondingly matched supporting and installation place on the lower machine frame 2 are closely fitted with the first cutter bar 31 and the second cutter bar 32. For example, an inner circumferential surface, i.e., a limiting surface, of the driven shaft second limiting part 104 on the upper machine frame 1 and an inner circumferential surface, i.e., a supporting surface, of the driven shaft second supporting part 204 on the lower machine frame 2 are closely joined together with an outer circumferential surface 343 of the shaft sheath part of the regulating shaft sheath 340. The structure can perform a similar sealing effect, without a need of installing a spacer or sealing ring, and can effectively prevent the food material from leaking during use.

Figure 3:
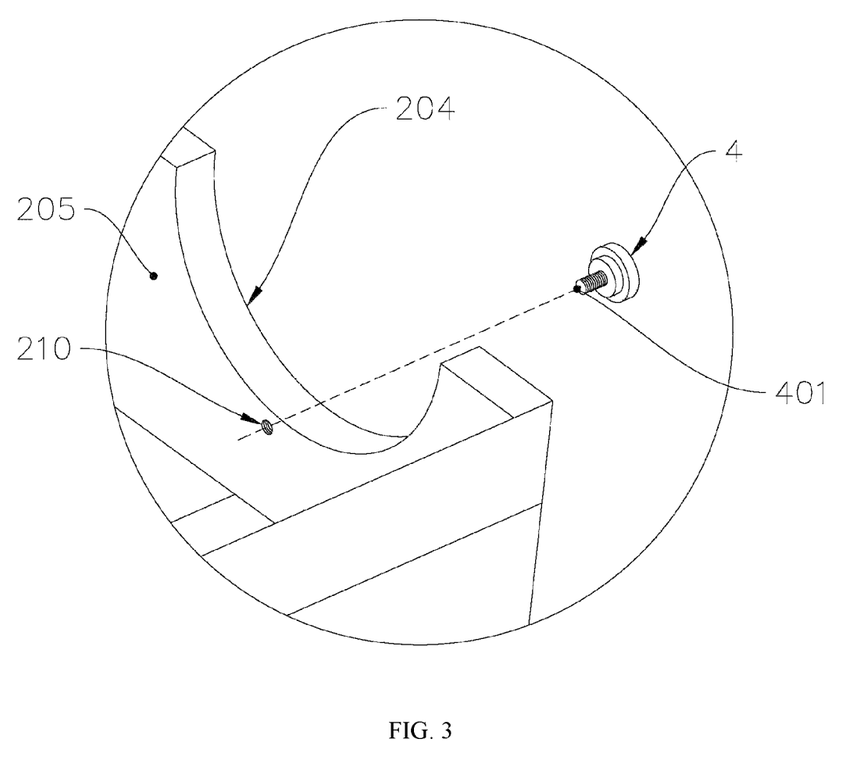
FIG. 3 is an enlarged diagram of A part in FIG. 1.
Figure 4:
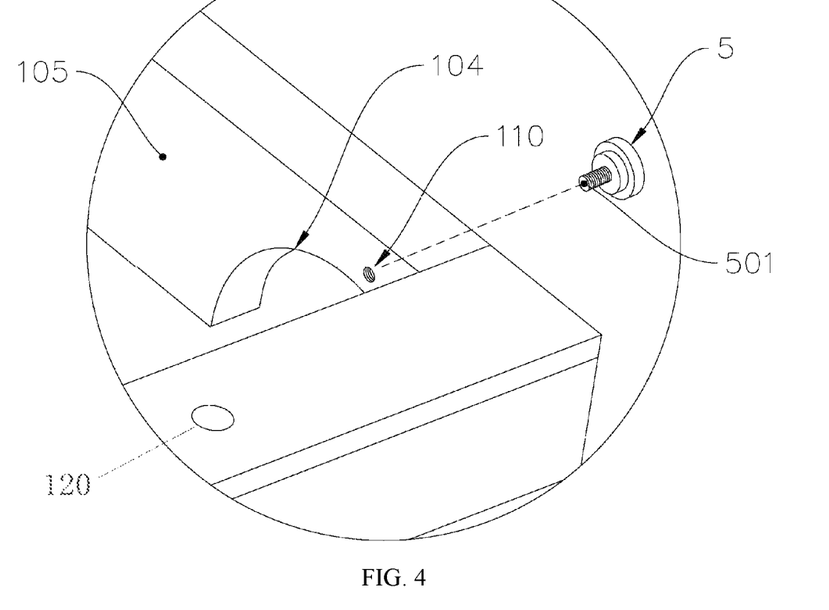
FIG. 4 is an enlarged diagram of B part in FIG. 1.

With reference to FIG. 3 and FIG. 4, FIG. 3 is an enlarged diagram of A part in FIG. 1, and FIG. 4 is an enlarged diagram of B part in FIG. 1. In combination with FIG. 1, the meat cutting machine further comprises a regulating ejector rod 4 and a regulating ejector rod 5. The regulating ejector rod 4 and the regulating ejector rod 5 comprise a knob part and a threaded rod coaxially connected with the knob part.

A threaded through hole 210 is arranged in the lower machine frame 2. A thread inner diameter of the threaded through hole 210 is in thread fit with the regulating ejector rod 4. The regulating ejector rod 4 can penetrate through the threaded through hole 210 and extends into an inner part of the lower machine frame 2. The threaded through hole 210 is arranged in a position close to a lower part of the driven shaft second supporting part 204.

A threaded through hole 110 is formed in the upper machine frame 1. A thread inner diameter of the threaded through hole 110 is in thread fit with the regulating ejector rod 5. The regulating ejector rod 5 can penetrate through the threaded through hole 110 and extends into an inner part of the upper machine frame 1. The threaded through hole 110 is arranged in a position close to an upper part of the driven shaft second limiting part 104.

In combination with FIG. 2, the regulating shaft sheath 340 comprises a shaft sheath part and a shaft shoulder 341. When the second cutter bar 32 is installed on the machine frame, an outer circumferential surface 343 of the shaft sheath part of the regulating shaft sheath 340 comes into contact with the inner circumferential surfaces of the driven shaft second supporting part 204 and the driven shaft second limiting part 104. At this moment, an end surface 342 of the shaft shoulder 341 is arranged oppositely to an inner wall surface 105 of the upper machine frame 1 and an inner wall surface 205 of the lower machine frame 2. The shaft shoulder 341 with this structure can also perform the effects of physically blocking the food material in the meat cutting machine from leaking from the side part of the machine frame, preventing the food material from remaining and avoiding causing pollution due to remaining food material. After the regulating ejector rod 4 and the regulating ejector rod 5 respectively enter the machine frame through the threaded through hole 210 and the threaded through hole 110, an end surface 401 of the regulating ejector rod 4 and an end surface 501 of the regulating ejector rod 5 face an end surface 342 of the shaft shoulder 341. Since both sides of the driven shaft first supporting part 203 and the driven shaft first limiting part 103 are through hole structures, the freedom of the second cutter bar 32 in an axial direction is not limited by the machine frame and the second cutter bar 32 can perform translation along the axial direction.

By taking the regulating ejector rod 4 as an example, rotating the knob part increases an extension range of the threaded rod part of the regulating ejector rod 4 relative to the machine frame so that the end surface 401 of the regulating ejector rod 4 is abutted against the end surface 342 of the shaft shoulder 341, the knob part is continuously twirled so that the second cutter bar 32 is pushed to perform translation along the central shaft 320 while the extension range of the regulating ejector rod 4 is increased relative to the machine frame; and while at the time of translating the second cutter bar 32, the blades 321 on the second cutter bar 32 can be close to the blades 311 on the first cutter bar 31, so as to keep a cutting blade action between two interactive cutters in the cutter group.

Similarly, the regulating ejector rod 5 can be regulated so that the end surface 501 is abutted against the end surface 342 of the shaft shoulder 341. The threaded through holes 210 and the threaded through holes 110 are uniformly distributed in the circumferential direction of the central shaft 320. The direction of an action force applied to the end surface 342 of the shaft shoulder 341 by the end surfaces of two regulating ejector rods is the same as the axial direction (i.e., a translation direction of the second cutter bar 32) of the central shaft 320. The direction of an action force applied to the end surface 342 of the shaft shoulder 341 by the end surface 401 of the regulating ejector rod 4 is parallel to the axial direction of the central shaft 320. Therefore, under the simultaneous action of two regulating ejector rods, the translation of the second cutter bar 32 is more stable to effectively prevent the formation of a bending moment due to uneven force to cause an adverse effect on the second cutter bar 32. A plurality of regulating ejector rods can be arranged in the present embodiment, to increase stability.

A user only needs to rotate the regulating ejector rods to provide timely regulation for a relative position of the blade according to the abrasion condition of a used cutter, so that the meat cutting machine always keeps a best operation state.

Since the second cutter bar 32 can perform translation along the axial direction through the regulating ejector rods, the regulating ejector rods 4 and 5 can also be used for regulating a distance between cutting blades of any two adjacent blades in the cutting blade region 30. Accordingly, a tooth thickness of the driven gear 303 shall be greater than a translation distance of the second cutter bar 32 through the regulating ejector rods along the axial direction, so as to ensure engaged transmission between the driven gear 303 after axial translation and the driving gear 302 and maximize an overlap ratio of the gears. A spacing between cutting edges of any two adjacent blades in the cutting edge region 30 is preferably 3-20 mm. Accordingly, the tooth thickness of the driven gear 303 is preferably 8-50 mm. Assuming that the spacing between any two adjacent blades 311 on the first cutter bar 31 is constant and the number of the blades 311 is the same as the number of the blades of the second cutter bar 32, food material with a meat cutting thickness of 3-20 mm can be cut.

The regulating ejector rods and corresponding threaded through holes in the present embodiment are preferably arranged at a side of the machine frame close to the gear operation region. Accordingly, the regulating shaft sheaths in the present embodiment are preferably arranged on a side of the second cuter bar close to the gear operation region, and are located on the gear operation region. The structure further simplifies a structure in the meat cutting operation region of the meat cutting machine, thereby realizing convenient processing of the food material and more smooth discharge of the food material, preventing the food material from remaining, avoiding causing pollution due to remaining food material, and benefiting smooth translation of the second cutter bar 32 through the regulating ejector rods along the axial direction.

Figure 5:
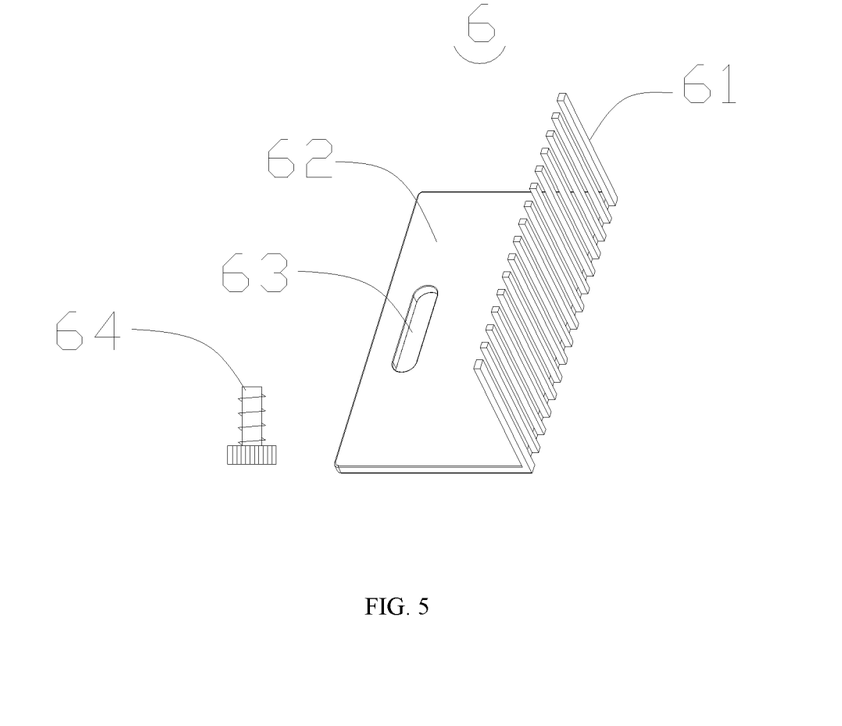
FIG. 5 is a schematic diagram of a related structure of a comb cutter in embodiments of a meat cutting machine of the present invention.

As shown in FIG. 5, the meat cutting machine further comprises a comb cutter 6. A threaded through hole 220 for installation and fixation is correspondingly arranged in a bottom surface of the lower machine frame 2. The comb cutter 6 comprises a plurality of comb teeth 61. The comb teeth 61 form an integral structure with a comb back plate 62 and are approximately perpendicular to the comb back plate 62. A regulating and installing groove 63 is penetrated in the comb back plate 62. During installation, the comb cutter 6 penetrates through the regulating and installing groove 63 through a knob screw 64 and is screwed in the threaded through hole 220, so as to approximately fix the comb cutter 6. Each comb tooth 61 is correspondingly inserted between any two adjacent blades 321 on the first cutter bar 31, and the number of the comb teeth 61 is preferably greater than the number of the blades 321 on the first cutter bar 31 by one, so that each of both sides of any one blade 321 has one comb tooth 61 and the spacing between any two adjacent blades 321 on the first cutter bar 31 is equal. Accordingly, a spacing between any two adjacent comb teeth 61 is equal. The comb cutter 6 of the structure has a more uniform effect in use. During use, the comb teeth 61 and the cutting edge region 30 do not interfere with each other. Tops of the comb teeth 61 are preferably abutted against the first cutter bar 31. A gap between the comb teeth 61 and two adjacent blades 321 is small, thereby realizing an effect of better combing out the food material bonded on the blades 321.

Since a single knob screw 64 of the comb cutter 6 is fixed, the comb cutter 6 is convenient in installation and disassembly. The comb cutter 6 can adapt to the matching with the blades 321 through the regulation of the regulating and installing groove 63. Since the comb back plate 62 covers part of the exposed blade group 3, even if an operator carelessly stretches in a hand from a lower part, the comb back plate 62 and the comb teeth 61 can perform blocking and protection effects, thereby increasing the safety. The comb cutter 6 with an integrated structure is preferably manufactured through a laser cutting technology, and is preferably made of food-grade material with strong deformation-resistant mechanical property, such as food-grade stainless steel material.

The meat cutting machine preferably comprises two comb cutters. The other comb cutter of the two comb cutters 6 can be arranged with reference to the above comb cutter 6, is arranged opposite to the comb cutter 6, and is used for combing out the food material bonded on the blades 321 of the second cutter bar 32. The arrangement of the two comb cutters 6 is beneficial for smoothly discharging the food material from the discharging port 200.

Figure 6:
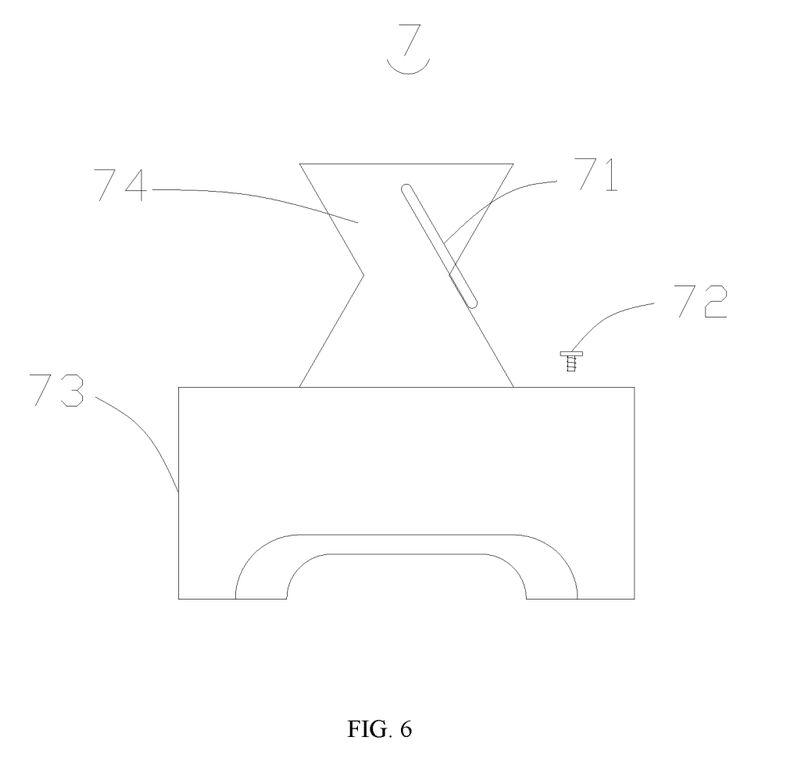
FIG. 6 is a schematic diagram of a related structure of an outer cover in embodiments of a meat cutting machine of the present invention.

As shown in FIG. 6, the meat cutting machine preferably further comprises an outer cover 7. Accordingly, a threaded through hole 120 is formed in a top surface of the upper machine frame 1. The outer cover 7 comprises a machine frame cover 73 and a feeding port cover 74. The machine frame cover 73 and the feeding port cover 74 can be fixedly sealed and connected. The machine frame cover 73 is covered on the machine frame. The feeding port cover 74 is covered on the feeding port 100. The feeding port cover 74 is perforated vertically. The outer cover 7 can be detachably fixed at the threaded through hole 120 through the knob screw 72. The meat cutting machine preferably further comprises a handle 71. The handle 71 is arranged at an upper part of the feeding port cover 74.

A shape of the feeding port cover 74 is preferably retracted in a middle. A middle cross-sectional area of the feeding port cover 74 is smaller than cross-sectional areas of both ends. A minimum cross-sectional width of the middle is preferably a maximum cut-able width of the cutter group 3. The shape of the feeding port cover 74 can also be preferably an approximate V shape. A minimum cross-sectional width of a bottom is preferably a maximum cut-able width of the cutter group 3. A vertical spacing from a top of the feeding port cover 74 to tops of the blades is preferably 150 mm. The feeding port cover with this shape can prevent the cutter group 3 from being blocked due to entry of too wide meat blocks, facilitate material feeding, protect the hand of the operator from entering carelessly and ensure operation safety. The outer cover 7 is convenient in installation and disassembly, is easy in cleaning, can protect the machine frame, and is beneficial for eliminating the remaining food material on a surface of the meat cutting machine and pollution caused by the remaining food material.

It should be understood that for those persons ordinarily experienced in the manufacturing equipment for the food service industry, improvements or transformations can be made according to the above explanation. All of these improvements and transformations shall belong to the protection scope of claims of the present invention.

The above exemplarily describes the patent of the present invention. Apparently, realization of the patent of the present invention is not limited by the above embodiments. Various improvements made by adopting method conceptions and technical solutions of the patent of the present invention or direct application of the conceptions and the technical solutions of the patent of the present invention to other occasions without improvements shall belong to the protection scope of the present invention.

What is claimed is:

1. A meat cutting machine, comprising a machine frame and a cutter group;
    the cutter group comprises at least two groups of cutter bars; the two groups of cutter bars are mutually parallel; and blades on the two groups of cutter bars are crosswise arranged to form a cutting edge region; wherein
    the machine frame comprises an upper machine frame and a lower machine frame; the upper machine frame and the lower machine frame are detachably connected; the cutter bars are supported on the lower machine frame; and the cutter bars are limited on the upper machine frame;
    the meat cutting machine further comprises a regulating ejector rod; at least one threaded through hole is formed in a side wall of the machine frame; and the regulating ejector rod is in thread fit with the threaded through hole; and
    the two groups of cutter bars further comprise shaft shoulders; and the regulating ejector rod penetrates through the threaded through hole and is abutted against end surfaces of the shaft shoulders so that one group in the two groups of cutter bars performs translation along a central shaft.

2. The meat cutting machine according to claim 1, wherein each of the cutter bars comprises a central shaft and a regulating shaft sheath; the central shaft and the regulating shaft sheath are in concentric assembly and rotating fit; the regulating shaft sheath is supported on the lower machine frame; the regulating shaft sheath is limited on the upper machine frame; and the regulating shaft sheaths have the shaft shoulders.

3. The meat cutting machine according to claim 1, wherein the shaft shoulders are located in the machine frame, and the threaded through hole is located on the side wall of the machine frame close to the shaft shoulders.

4. The meat cutting machine according to claim 1, wherein a limiting surface for limiting on the upper machine frame and a supporting surface correspondingly matched for supporting on the lower machine frame are closely fitted with an outer circumferential surface of a contact part of the cutter bars for sealing.

5. The meat cutting machine according to claim 1, wherein gears are further respectively arranged on the two groups of cutter bars, and the gears are close to the side wall of the machine frame for transmission between the two groups of cutter bars.

6. The meat cutting machine according to claim 5, wherein the gears are located in the machine frame, and the shaft shoulders are located between the gears and an inner side wall of the machine frame close to the gears.

7. The meat cutting machine according to claim 5, wherein the upper machine frame and the lower machine frame respectively further comprise a baffle plate; when the upper machine frame and the lower machine frame are assembled together, the baffle plates of the upper machine frame and the lower machine frame divide an inner space of the machine frame into a gear operating region and a meat cutting operation region and through holes through which the cutter bars penetrate are reserved in the baffle plates of the upper machine frame and the lower machine frame; and the through hole is formed by superposing or splicing the baffle plates of the upper machine frame and the lower machine frame.

8. The meat cutting machine according to claim 7, wherein the gears are located in the gear operation region, and the blades are located in the meat cutting operation region.

9. The meat cutting machine according to claim 7, wherein the gear operation region of the upper machine frame is in a groove shape.

10. The meat cutting machine according to claim 7, wherein the gear operation region of the lower machine frame is vertically penetrated.

11. The meat cutting machine according to claim 5, wherein in the two gears, a gear thickness of the gears translating along with the cutter bars is larger than a translation distance so that the two gears keep meshed.

12. The meat cutting machine according to claim 1, wherein one group in the two groups of cutter bars further comprises an input shaft; the upper machine frame further comprises an input shaft limiting part; the lower machine frame further comprises an input shaft supporting part; and when the upper machine frame and the lower machine frame are assembled together, the input shaft limiting part and the input shaft supporting part together form an internationally universal No. 12 connector.

13. The meat cutting machine according to claim 1, wherein one group in the two groups of cutter bars performs translation by 3-20 mm relative to the other group along a central shaft.

14. The meat cutting machine according to claim 1, wherein the meat cutting machine further comprises a comb cutter; the comb cutter comprises comb teeth and a comb back plate; the comb teeth are approximately perpendicular to the comb back plate and form an integral structure with the comb back plate; and the comb cutter is detachably fixedly arranged at a bottom of the lower machine frame.

15. The meat cutting machine according to claim 1, wherein the meat cutting machine further comprises a feeding port cover; the feeding port cover is in a shape retracted in a middle or an approximate V shape; and a minimum cross-sectional width is below a maximum cut-able width of the cutter group.

16. The meat cutting machine according to claim 2, wherein the regulating shaft sheath and the central shaft are connected through a bearing.

* * * * *